United States Patent [19]

Moroto et al.

[11] E Patent Number: Re. 31,621

[45] Reissued Date of Patent: Jul. 3, 1984

[54] LOCK-UP CLUTCH FOR A HYDRAULIC UNIT

[76] Inventors: Shuzo Moroto, 39-8 Takane-cho, Kamezaki Handa Aichi Prefecture; Koiyi Kobayashi, 112-8 Nishiyama Nakane-cho, Toyoda Aichi Prefecture, both of Japan

[21] Appl. No.: 439,937

[22] Filed: Nov. 8, 1982

Related U.S. Patent Documents

Reissue of:

[64] Patent No.: 4,274,519
Issued: Jun. 23, 1981
Appl. No.: 31,505
Filed: Apr. 19, 1979

[30] Foreign Application Priority Data

Apr. 28, 1978 [JP] Japan ..... 53-51162

[51] Int. Cl.[3] ..... F16D 3/66; F16D 13/70

[52] U.S. Cl. ..... 192/3.28; 192/106.2; 192/107 M

[58] Field of Search ..... 192/3.28, 3.29, 3.3, 192/3.31, 3.32, 106.2, 107 M

[56] References Cited

U.S. PATENT DOCUMENTS 3,491,617 1/1970 Konrad ..... 192/3.29 X
3,497,043 2/1970 Leonard ..... 192/3.3 X
3,654,692 4/1972 Goetz ..... 192/107 M
3,802,541 4/1974 Schneider ..... 192/106.2 X
4,138,003 2/1979 Malloy ..... 192/3.29 X

*Primary Examiner*—George H. Krizmanich
*Attorney, Agent, or Firm*—Cooper, Dunham, Clark, Griffin & Moran

[57] ABSTRACT

A lock-up clutch having high durability and high reliability of operation is provided in the present invention. Said lock-up clutch comprises a pump impeller connected mechanically with a prime mover, a power shaft, a turbine runner which transmits a driving force given by said pump impeller through a fluid to the power shaft, a stator which forces the circulating flow of a fluid to said pump impeller from said turbine runner, and a one-way clutch which restricts unilaterally the direction of rotation of said stator, wherein the lock-up clutch for a hydraulic unit featuring the provision of a lock-up clutch installed between said pump impeller and said turbine runner to transmit input from the power shaft of said prime mover to said turbine runner by direct, mechanical connection without a medium of a fluid, and of a vibration damper absorbing the torsional vibration from the prime mover or the power shaft when said lock-up clutch is operated, and the installation of said vibration damper in the outside of a circulation flow passage near the inlet caliber of said turbine runner.

11 Claims, 4 Drawing Figures

Fig. 3.
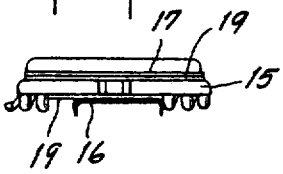
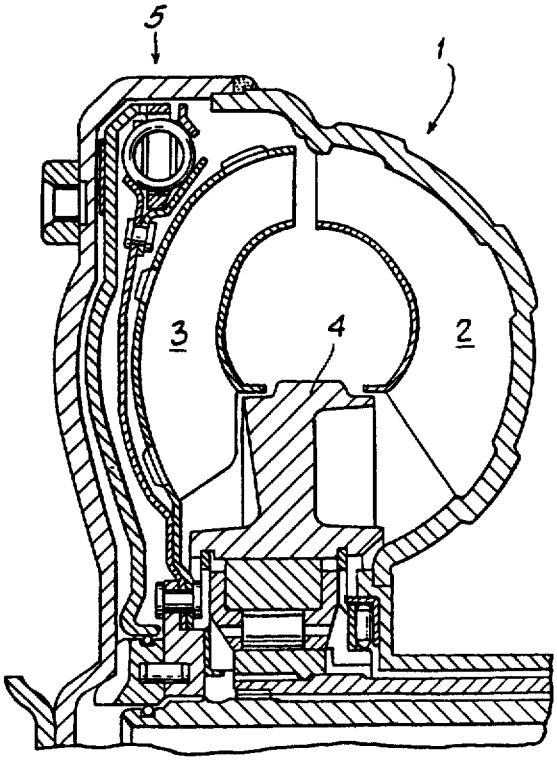
Fig. 4.

LOCK-UP CLUTCH FOR A HYDRAULIC UNIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a lock-up clutch installed on a hydraulic torque conventor or a fluid coupling.

2. Description of the Prior Art

Hitherto, vibration damper which absorbs the torsional vibration from the prime mover has been installed in lock-up clutch for a hydraulic unit. Said vibration damper was installed conventionally on a hydraulic unit or near the small caliber of a fluid circulation passage of a fluid coupling or in the outside of a fluid circulation passage near a stator as is disclosed in U.S. Pat. Nos. 4,027,757, 4,049,093 and so on, so that the dimension in the axial direction of a hydraulic unit or a fluid coupling was remarkably enlarged, being disadvantageous in the loading of a vehicle. Moreover, the piston controlling the operation of said lock-up clutch, slides on the driving function, for example, spline, slot, of power transmission in an axial direction to a turbine runner in said conventional lock-up clutch so that remarkable unreasonableness existed because of the frictional resistance generated at the contact surface of the driving function of power transmission at the release of a lock-up clutch, so that the reliability was made low.

SUMMARY OF THE INVENTION

An object of the invention is to provide a lock-up clutch having high durability, and high reliability of operation, with the defect of a conventional lock-up clutch mentioned above being solved, and hereby to use jointly the special features such as the stepless torque conversion characteristic, vibration-absorption characteristic, the easiness of operation and the like of a hydraulic torque convertor or a fluid coupling which was unable to be accomplished hitherto and the high joint efficiency of a mechanical type of joint, by means of the changeover operation of the case through said fluid and the case through mechanical combination.

In addition, another object of the invention is to add the function as a mechanical type of joint with high efficiency by the slight change of the design and the slight increase in the volume, in a conventional hydraulic torque convertor or fluid coupling.

Said objects can be attained by a lock-up clutch comprising a pump impeller connected mechanically with a prime mover, a power shaft, a turbine runner which transmits a driving force given by said pump impeller through a fluid to the power shaft, a stator which forces the circulating flow of a fluid to said pump impeller from said turbine runner, and a one-way clutch which restricts unilaterally the direction of rotation of said stator, wherein the lock-up clutch for a hydraulic unit featuring the provision of a lock-up clutch installed between said pump impeller and said turbine runner to transmit input from the power shaft of said prime mover to said turbine runner by direct, mechanical connection without a medium of a fluid, and of a vibration damper absorbing the torsional vibration from the prime mover or the power shaft when said lock-up clutch is operated, and the installation of said vibration damper in the outside of a circulation flow passage near the inlet caliber of said turbine runner. The following merits are obtained by the present invention.

(1) By means of the installation of a vibration damper on a lock-up clutch, the torsional vibration from a prime mover side or the unevenness of rotation is lessened by said vibration damper and also a bad effect which is exercised over a prime mover by the reverse driving force from a power shaft is lessened.

(2) By means of the installation of said vibration damper near the large caliber of a fluid circulation passage in the outside of the fluid circulation passage of a hydraulic torque conventor or a fluid coupling, the clearance disregarded as it is so far unnecessary of hydraulic torque converter or fluid coupling is put effectively to practical use, and also the increase in size due to the equipment of said lock-up clutch is remarkably lessened as compared with the case where said vibration damper is installed near the small caliber of a fluid circulation passage.

(3) By means of the setting of the flexibility characteristic within a certain elastic limit in an axial direction the driven element of said lock-up clutch mechanically connected to the turbine runner of a hydraulic torque converter or a fluid coupling, and as a result of the combination of a driven element with said flexibility characteristic and an engaging element (an annular piston 14) of said lock-up clutch by spline with notches movable in an axial direction, the certainty of the operation not possessed hitherto can be brought to said lock-up clutch.

BRIEF DESCRIPTION OF THE DRAWINGS

FIG. 3 is a schematic drawing showing a vibration damper area viewed from an arrow B.

FIG. 4 is the sectional view of a lock-up clutch for a hydraulic unit showing another example of the present invention.

Like parts are indicated by corresponding reference characteristics throughout the several views of the drawings.

DETAIL DESCRIPTION OF THE PREFERRED EMBODIMENTS

Figure 1:
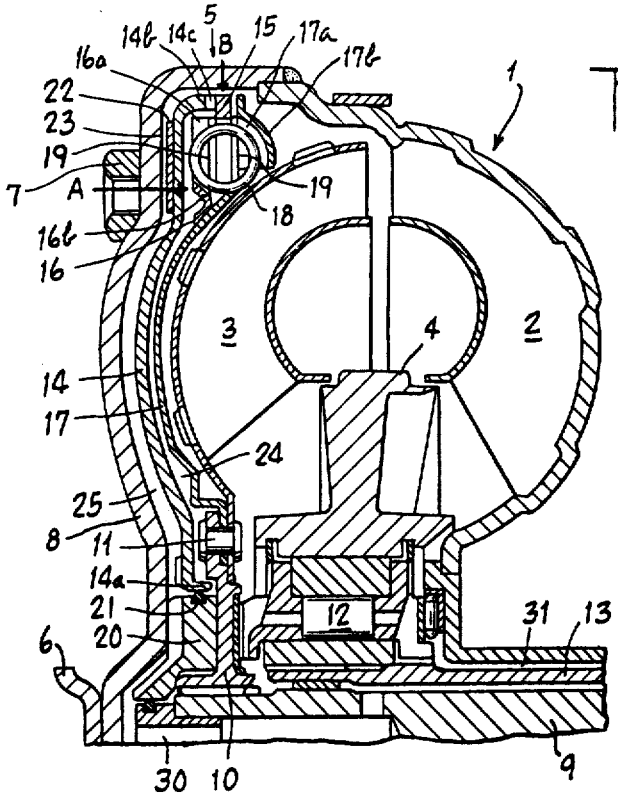
FIG. 1 is a sectional view showing the lock-up clutch for hydraulic unit of the present invention.
Figure 2:
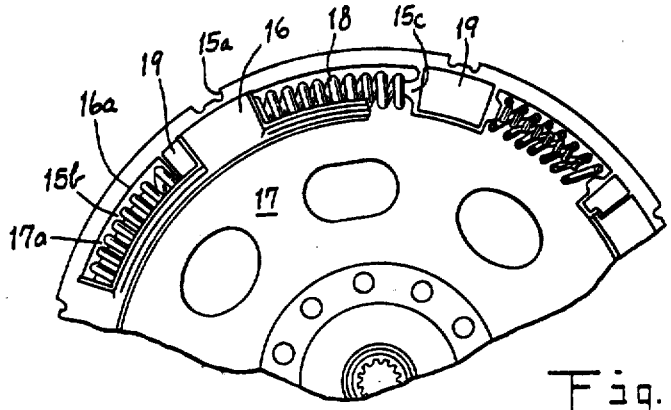
FIG. 2 is a schematic drawing showing a vibration damper area viewed from an arrow A.

One embodiment of the invention will be better understood from the following description taken in connection with the accompanying drawings in which: FIG. 1, FIG. 2 and FIG. 3 are a sectional drawing and schematic drawings where one embodiment of a hydraulic speed change gear is shown, in which the clutch unit directly connected to a hydraulic torque converter is incorporated. In FIG. 1, a hydraulic torque converter 1 comprises a pump impeller 2, a turbine runner 3 and a stator 4, and a lock-up clutch 5 is installed between a pump impeller 2 and a turbine runner 3 to connect both mechanically. A pump impeller 2 is connected to a casing 8 having a pilot 6 and a connecting nut 7 and is connected to the power shaft of an engine through the pilot 6 and the connecting nut 7. A turbine runner 3 is connected by a rivet 11 to a turbine hub 10 spline-fitted to the power shaft 9 of a hydraulic unit 1. A stator 4 is connected to a fixed shaft 13 through an one-way clutch 12. A lock-clutch 5 is composed of an annular piston 14, a driving plate 15, a front driven plate 16, a rear driven plate 17, a vibration damper 18, a resistance member 19 and a plain bearing 20. An annular piston 14, having a flange area 14a, 14b respectively at the internal circumference and external circumference, is movably arranged in an axial direction through a sealant 21 to the plain bearing 20, a spline 14c having plural notches is formed at the flange area of the external circumference. In addition, a frictional material 22 is arranged to engage a frictional surface 23 installed on a casing 8, with it being locked on the disc-shaped area of an annular piston 14. Furthermore, a lock-up clutch engaging chamber 24 is partitioned off a lock-up clutch releasing chamber 25 by this annular piston 14.

A disc-shaped driving plate 15, which has spline 15a having plural notches at the external circumferential area, engages spline 14c installed on the external circumferential flange area 14b of an annular piston 14. Hard facing treatment is performed respectively for spline 14c, spline 15a to prevent the wear at the sliding surface. And also, a driving plate 15 has plural extracted windows 15b to put in a vibration damper 18 in the circumferential direction. A window 15b has a projection 15c to hold a vibration damper at both ends. A rear driven plate 17, which is connected to a turbine runner 3 through a rivet 11 at the internal circumferential area, has a vibration damper 18 inserted by a window 17a, with said window 17a extracted by the same size as the size in the circumferential direction of the window 15b of a driving plate 15 being installed on the external circumferential area. In addition, for a rear driven plate 17, a tab plate 17b is installed to regulate the motion of a vibration damper at the surface other than the plane where it is laid.

A front driven plate 16 is located on a rear driven plate 17 at the internal circumferential area, furthermore having a window 16a and a tab (plate) 16b at the same position as the rear driven plate 17. A vibration damper 18 is composed of, say a coil spring and the like, is put in a window 15b, 16a and 17a installed on a driving plate 15, a front driven plate 16 and a rear driven plate 17. A resistance member 19 exists, being inserted among a driving plate 15, a front driven plate 16 and a rear driven plate 17, and the member 19 is provided with a proper drag resistance among a driving plate 15, a front driven plate 16 and a rear driven plate 17.

The operation of a lock-up clutch of the invention thus composed shall be disclosed.

When a lock-up clutch is not operated, . . . pressurized oil is supplied to an oil groove 30 from an unillustrated pressurized oil operation mechanism, being exhausted from an oil groove 31 after the circulation in a hydraulic unit.

In this case, as pressurized oil is led to a lock-up clutch release chamber 25, the formation of a flow passage, that is, clearance by said pressurized oil between the friction surface 23 of a casing 8 and a friction material 22 installed on an annular piston 14 results in the release of a lock-up clutch 5. Accordingly, the hydraulic unit is operated as a torque converter.

When a lock-up clutch is operated, . . . once pressurized oil is supplied to an oil groove 31 from an unillustrated pressurized oil operation mechanism, pressurized oil is led to a lock-up clutch engaging chamber 24, an annular piston 14 being pushed to the left side shown in FIG. 1. As a result, a lock-up clutch 5 is operated, with a friction material 22 being engaged the friction surface 23 of a casing 8. At this time, the power from an engine, which is transmitted from the friction surface 23 of a casing 8, in the order of a friction material 22, an annular piston 14, notch 14c, a driving plate 15, a vibration damper 18, front and rear driven plate 16, 17, and a turbine hub 10, is transmitted mechanically to a power shaft 9.

At this time, an annular piston 14 and a driving plate 15 are in the unengaged state [of] *with* no transmission of power [up to the time] *until* just before notch 14c is engaged with notch 15a, so that they are movable nearly regardless of the dimensional unevenness in the interior of a hydraulic unit.

Secondly, in the case where a lock-up clutch mentioned above is forced to operate as a hydraulic unit, with the engagement state being cut off, an oil groove 31 may be taken as an exhaust groove by supplying an oil groove 30 with pressurized oil again. If a rear driven plate 17 is formed with a material with high rigidity, a driving force transmitted by a lock-up clutch once engaged, disturbs the movement of an annular piston 14 in the right direction shown in a figure for the release of lock-up clutch due to the friction in an axial direction of notch 14c, 15a of an annular piston 14 and a driving plate 15. If a rear driven plate 17 is, however, formed with flexible material as the present invention, minute clearance is secured at the friction surface by the slight deflection of a rear driven plate 17 and on the moment, the power transmission state at said notched area 14c, 15a is released, so that an annular piston 14 comes to be movable smoothly in the right direction shown in a figure. In addition, the tab 16b, 17b of front and rear driven plates 16, 17 guiding a vibration damper 18 come into mechanical contact with said vibration damper 18, so that they cause wear when said front and rear driven plates 16, 17 are formed with soft material.

So, the surface treatment for an increase in hardness is performed at the areas of 16b, 17b. In another way, it is also possible to prevent the wear by securing the member with hard material on a contact surface with the vibration damper 18 of said tabs 16b and 17b.

FIG. 4 shows another example of the present invention and the turbine runner 3 of a hydraulic unit is composed of a flat type. When this type is used, a lock-up clutch having a vibration damper is arranged at the shortened area of size in an axial direction due to flatness, so that further shortening of size in an axial direction is possible.

We claim:

[1. A torque converter consisting of a pump impeller connected mechanically with a power shaft of a prime mover; a turbine runner which transmits a driving force given by said pump impeller through a fluid to said power shaft; a lock-up clutch which is installed between said pump impeller and said turbine runner to transmit directly input from the power shaft of said prime mover to said turbine runner by mechanical connection without an intermediate fluid; a vibration damper which is installed outside of the circulation flow passage of said fluid near the inlet opening of said turbine runner to absorb the torsional vibration from the prime mover or the power shaft when said lock-up clutch is operated; a stator which forces the circulating flow of the fluid to said pump impeller from said turbine runner; and a one-way clutch which restricts unilaterally the direction of rotation of said stator; said lock-up clutch consisting of an annular piston having a power transmission surface which is a friction material engaging a power transmission surface installed on a casing connecting with said pump impeller and movable in an axial direction, a driving plate connected with said annular piston to be driven on the plane crossing at nearly right angles to the axis of the torque converter, a driven plate equipped between said turbine runner and said annular piston, a resistance member placed between said driving plate and said driven plate to give a proper drag resistance to the relative rotational motion of said driving plate and said driven plate, and a plain bearing supporting the reciprocating motion of said annular piston and the relative rotatory motion of said turbine runner and said casing; said vibration damper being between the outside circumference of said driven plate which is fixed to the root of said turbine runner at its inside circumference and having an outside diameter nearly equal to the entrance diameter of said turbine runner and the inside circumference of said driving plate, the outside circumference of said driving plate being connected with the outside circumference of said annular piston.]

2. A torque converter of claim [1] *10*, wherein said driven plate [consists of] *comprises* a rear driven plate and a front driven plate [which], *wherein said rear driven plate* is attached to the [outside] *external* circumference of said [rear] *front* driven plate, and wherein said vibration is supported between said rear driven plate and said front driven plate.

3. A torque converter of claim [1] *10*, wherein said driving plate is connected by plural notches formed at the outside circumference of the flange *area* of said annular piston and said driven plate pinches said driving plate in an axial direction to place said vibration damper between them.

4. A torque converter of claim 2, wherein said driven plate has a window in which said vibration damper is put near the inlet opening of said turbine runner and is formed by using an elastic member easily flexible in an axial direction.

5. A torque converter of claim 2, wherein said annular piston has a larger movable amount in an axial direction due to the notch formed on the external circumferential flange area.

6. A torque converter of claim 2, wherein surface hardening treatment [was performed] at the notches area formed on the external, circumferential flange area of said annular piston.

7. A torque converter of claim 2, wherein hard facing treatment [was performed] *formed* at the notched area where said driving plate is connected to said annular piston, and at the external, circumferential area of a window for having said vibration damper.

8. A torque converter of claim 2, wherein said two driven plates have respectively overhangings to restrict motion of said driving plate in the plane [paralled] *paralleled* to the surface of rotation, and also surface hardening treatment [was performed for] *formed at* the surface of said overhanging contacting with said vibration damper [or a hardened member was placed between said overhanging and said vibration damper].

*9. The torque converter of claim 10 wherein the lock-up clutch further comprises a resistance member placed between said driving plate and said driven plate to give a proper drag resistance to the relative rotational motion of said driving plate and said driven plate.*

*10. A torque converter comprising:*

*a. a pump impeller connected mechanically with a power shaft of a prime mover;*

*b. a turbine runner which transmits a driving force given by said pump impeller through a fluid to said power shaft;*

*c. A stator which forces the circulating flow of the fluid to said pump impeller from said turbine runner;*

*d. A one-way clutch which restricts unilaterally the direction of rotation of said stator;*

*e. a lock up clutch comprising an annular piston having a flange area and notches on the external circumference of said flange area, said annular piston being movable in an axial direction, capable of engaging aid disengaging with a casing, said casing being connected with said pump impeller, said pump impeller being installed between said casing and said turbine runner to transmit directly input from the power shaft of said prime mover to said turbine runner by mechanical means;*

*f. a circulation flow passage for said fluid, located near an inlet opening of said turbine runner;*

*g. a vibration damper installed outside of said circulation flow passage;*

*h. a friction material installed between said annular piston and said casing, said friction material engaging a power transmission surface;*

*i. a driving plate connected with said annular piston, said driving plate having notches on its external circumference, said notches crossing the axis of said torque converter at nearly right angles, said driving plate capable of being driven on the plane of said annular piston;*

*j. a driven plate rotatably connected to said driving plate, positioned between said turbine runner and said annular piston; and*

*k. means for supporting reciprocal motion of said annular piston and the relative rotary motion of said turbine runner and said casing, wherein said vibration damper engages with a plurality of openings on said driving plate, and is between the outside circumference of said driven plate which is fixed to said turbine runner at its inside circumference and the inside circumference of said driving plate, said driving plate having an outside diameter nearly equal to the entrance diameter of said turbine runner, and the outside circumference of said driving plate being splined with the outside circumference of said annular piston.*

*11. A torque converter of claim 10, wherein said driven plate comprises a rear driven plate and a front driven plate, wherein said front driven plate is attached to the outside circumference of said rear driven plate and wherein said vibrating damper is supported between said rear driven plate and said front driven plate.*

*12. A torque converter of claim 2, wherein said two driven plates have respectively overhangings to restrict motion of said driving plate in the plane parallel to the surface of rotation, and a hardened member is placed between said overhanging and said vibration damper.*

* * * * *